United States Patent
Mercurio (12) 
(10) Patent No.: US 6,874,796 B2
(45) Date of Patent: Apr. 5, 2005

(54) SULKY WITH BUCK-BAR

(76) Inventor: George A. Mercurio, P.O. Box 874007, Wasilla, AK (US) 99687

( * ) Notice: Subject to any disclaimer, the term of this patent is extended or adjusted under 35 U.S.C. 154(b) by 38 days.

(21) Appl. No.: 10/309,259

(22) Filed: Dec. 4, 2002

(65) Prior Publication Data

US 2004/0108686 A1 Jun. 10, 2004

(51) Int. Cl.$^7$ ............................................... B62D 63/00
(52) U.S. Cl. ...................................... 280/32.7; 280/400
(58) Field of Search ......................... 280/32.7, 63, 78, 280/166, 494, 492, 493, 498, 489, 400, 479.3, 411.1, 447; 172/433, 257, 329, 41; D15/17

(56) References Cited

U.S. PATENT DOCUMENTS

| | | | |
|---|---|---|---|
| 2,218,064 A | * 10/1940 | Amsbury | 280/32.7 |
| 2,740,462 A | 4/1956 | Stegeman | |
| 3,874,691 A | 4/1975 | Larsen | |
| 4,192,525 A | 3/1980 | Clark | |
| 4,998,948 A | 3/1991 | Osterling | |
| 5,118,123 A | * 6/1992 | Betrock | 280/32.7 |
| 5,388,850 A | * 2/1995 | Simone | 280/442 |
| 5,564,721 A | * 10/1996 | Wians | 280/32.7 |
| 5,697,623 A | 12/1997 | Bermes et al. | |
| 5,813,679 A | * 9/1998 | Hobrath | 280/32.7 |
| 6,145,855 A | 11/2000 | Bellis, Jr. | |
| 6,485,036 B1 | * 11/2002 | Bricko | 280/32.7 |
| 6,637,760 B1 | * 10/2003 | Carman | 280/32.7 |
| 6,692,010 B1 | * 2/2004 | Johnson et al. | 280/32.7 |

OTHER PUBLICATIONS

Web page: http://www.keehnpower.com/honda.htm.
Web page: http://www.encoreequipment.com/pages/equipmen/equiacce.htm.
Web page: http://www.yazookees.com/products/accessories.html.
Web page: http://www.lawnmowersplus.com/mower_access.htm.

\* cited by examiner

*Primary Examiner*—Lesley D. Morris
*Assistant Examiner*—Tony Winner (57) ABSTRACT

A two-wheeled riding sulky for powered ground-maintenance machines includes, in addition to a primary hitch connection which operates in tension between the powered ground-maintenance machine and the sulky, a buck-bar which operates in compression between these two devices. The buck-bar is used to prevent the powered ground-maintenance machine from bucking. In a preferred embodiment, the powered ground-maintenance machine is a snow blower having only two ground-engaging, load-bearing traction wheels.

19 Claims, 6 Drawing Sheets

SULKY WITH BUCK-BAR

BACKGROUND OF THE INVENTION

1. Field of the Invention

This invention relates to the field of sulkies for powered ground maintenance equipment. More particularly, the invention relates to the field of improved connections between sulkies and ground maintenance equipment.

2. Description of the Related Art

Sulkies for powered walk-behind devices such as lawn mowers, snow blowers, and other ground maintenance equipment are known. Examples are shown in U.S. Pat. No. 5,564,721 to Wians, U.S. Pat. No. 6,145,855 to Bellis U.S. Pat. No. 5,813,679 to Hobrath, U.S. Pat. No. 5,697,623 to Bermes, U.S. Pat. No. 5,388,850 to Simone, U.S. Pat. No. 4,998,948 to Osterling, U.S. Pat. No. 4,192,525 to Clark, U.S. Pat. No. 3,874,691 to Larsen, U.S. Pat. No. 2,740,462 to Stegeman, and in the following web-pages: http://www.keehnpower.com/honda.htm; http://www.encoreequipment.com/pages/equipmen/equiacce.htm; http://www.yazookees.com/products/accessories.html; http://www.lawnmowersplus.com/mower_access.htm. All of the aforementioned U.S. patents are incorporated by reference herein.

Of particular note is U.S. Pat. No. 5,564,721 to Wians which reveals a lawn mower sulky platform which is connected to a tractor by means of a bracket or hitch point and upper and lower support members.

There remains a need for a simple, robust, and inexpensive sulky for powered ground maintenance equipment which can be stably attached to the tractor device in such a manner as to prevent the tractor device (which can include a two-wheeled tractor device) from bucking.

SUMMARY OF THE INVENTION

It is an object of the invention to provide a simple and robust sulky for a powered ground maintenance machine which is both low in cost and adapted to be used with a large variety of powered ground maintenance machines having differing dimensions.

It is another object of the invention to provide a simple and robust sulky for two-wheeled or track-laying powered ground maintenance machines such as snow blowers.

In one respect, the invention relates to a riding attachment for a powered ground maintenance machine, comprising: a trailer frame for supporting a rider; a pair of spaced-apart wheels rotatably mounted to a rear portion of the trailer frame; a hitch assembly provided at a forward portion of the trailer frame for connecting the riding attachment to a frame of the powered ground maintenance machine, the hitch assembly allowing relative movement between the trailer frame and the powered ground maintenance machine about a vertical axis; and a buck-bar, for supporting compressive loads, interposed between a midsection of the trailer frame and an upper portion of the frame of the powered ground maintenance machine.

In another respect, the invention relates to a two-wheeled riding sulky attachment and a powered ground maintenance machine which include an adjustable hitch assembly interposed between a forward end of the two-wheeled riding sulky attachment and a frame of the powered ground maintenance machine, the adjustable hitch assembly including a hitch tongue connected to the two-wheeled riding sulky attachment, an adjustable polygonal bracket assembly connected to the frame of the powered ground maintenance machine, and connection means for interconnecting the hitch tongue and the adjustable polygonal bracket assembly; and an adjustable buck-bar interposed between an intermediate portion of the two-wheeled riding sulky attachment and an upper portion of the powered ground maintenance machine, the adjustable buck-bar including length adjusting means for adjusting an operative length of the buck-bar between the intermediate portion of the two-wheeled riding sulky attachment and an upper portion of the powered ground maintenance machine.

The invention will, however, be best understood by a review of the following specification in conjunction with the accompanying drawings in which:

DETAILED DESCRIPTION OF THE PREFERRED EMBODIMENTS

Figure 1:
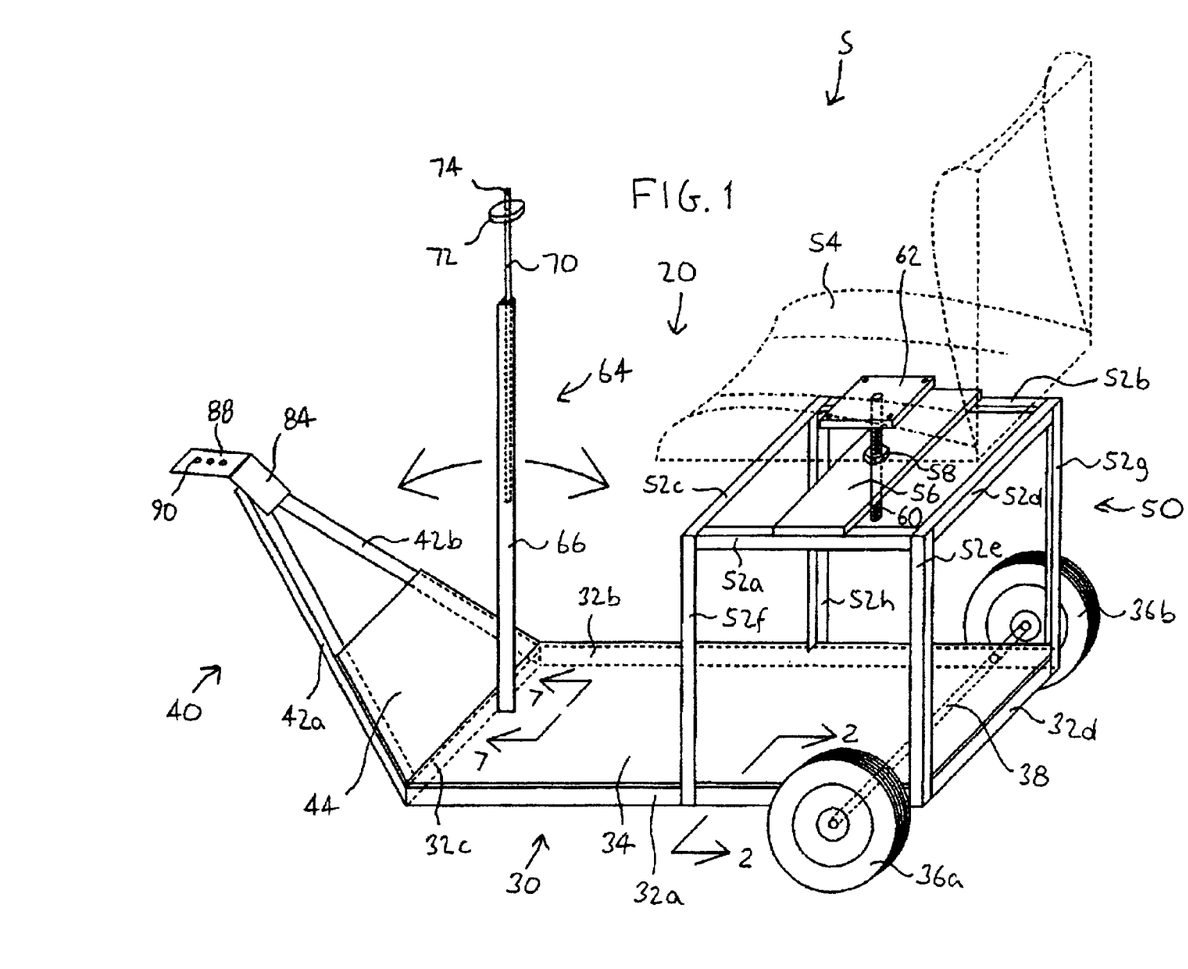
FIG. 1 is a perspective view of a sulky with a buck-bar according to a preferred embodiment of the invention.

Referring now to the drawings in which like reference characters indicate like elements throughout, there is shown in FIG. 1 a sulky S (or riding attachment for a powered ground maintenance machine, or "come-along") comprised primarily of a metal trailer frame 20 with associated attachments as will be hereinafter described. In the preferred embodiment, the trailer frame 20 is a unitary welded assembly that includes a base frame 30, a hitch frame 40, and a seat frame 50.

The base frame 30 is rectangular and is made from four beam members 32a, 32b, 32c, and 32d (two longitudinal and two transverse) welded together to form a rectangle and covered with a steel plate 34. In the preferred embodiment, the base frame is 36" long by 18" wide, the beam members of the base frame are made from 1½" section angle-irons, and the base frame steel plate is ⅛" thick.

The hitch frame 40 is triangular and is made from two beam members 42a, 42b that are welded together to form the apex and two sides of a triangle. The two beams are covered with a trapezoidal steel plate 44, and the ends of the beam members 42a, 42b remote from the apex are welded to the base frame in such a manner that the hitch frame 40 extends forwardly and upwardly from the base frame 30. (The steel plate 44 may also be welded to the base frame 30.) In the preferred embodiment, the two beam members 42*a*, 42*b* are each approximately 22" long and extend forwardly from the base frame 30 approximately 12" and upwardly from the base frame 30 approximately 16". Additionally, in the preferred embodiment, the beam members of the hitch frame are made from 1½" section angle-irons, and the hitch frame steel plate is ⅛" thick.

The seat frame 50 is parallelepiped in shape and is made from eight beams 52*a*–52*h* which are welded together. The beams 52*a*–52*d* are welded together to form a rectangle or square, and the beams 52*e*–52*h* are individually welded to the rectangle or square so as to extend downwardly from the corners thereof. The lower ends of the beams 52*e*–52*h* are welded to the base frame 30, with the beams 52*e*, 52*g* being joined to the rearward corners of the base frame. In the preferred embodiment, the beam members of the seat frame are made from 1½" section angle-irons and may each be approximately 18" long.

The associated attachments to the trailer frame 20 of FIG. 1 will next be described with additional reference to FIGS. 2 to 9.

Figure 2:
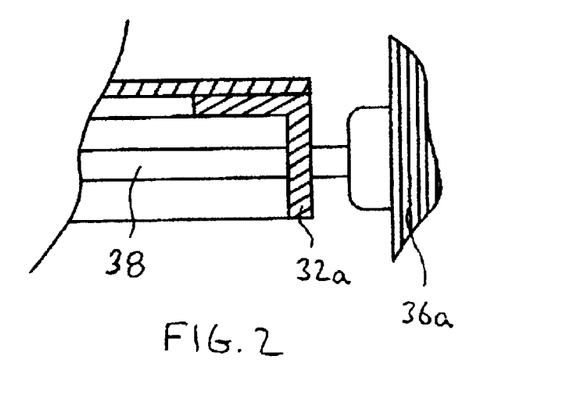
FIG. 2 is a cross-sectional view taken along the lines 2—2 in FIG. 1 showing the wheel axle and base frame of the sulky.

A pair of spaced-apart, co-axial wheels 36*a*, 36*b* (e.g. with 8" balloon tires) are rotatably attached to the base frame 30 in the manner shown in FIG. 2. Specifically, an axle 38 is mounted to and extends through holes in the vertical flanges of the beam members 32*a*, 32*b* of the base frame 30 (e.g. 6" from the rear end of the base frame 30), and the wheels 36*a*, 36*b* are attached to the axle in a manner known in the art.

Figure 3:
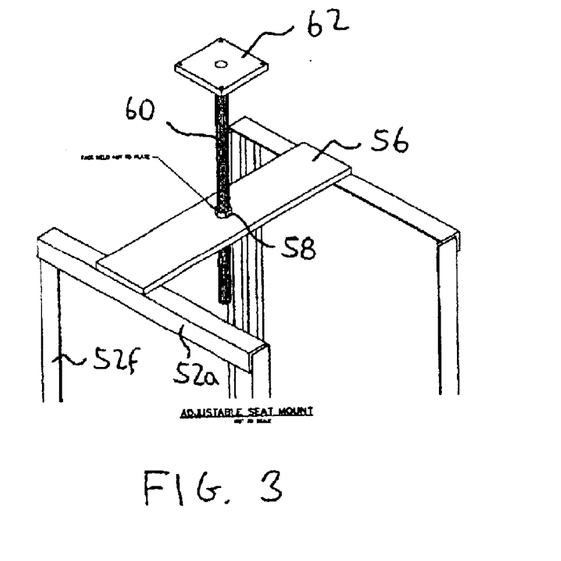
FIGS. 3 and 4 are perspective and exploded views of the adjustable seat mounting.
Figure 4:
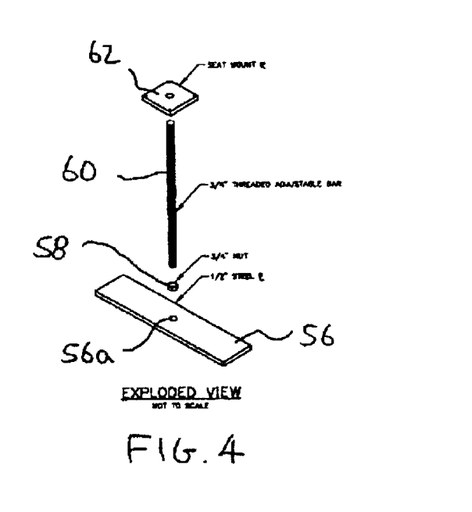

A seat 54 is adjustably mounted to the seat frame 50 in the manner shown in FIGS. 3 and 4. Specifically, a seat mount bar 56 (made e.g. from ½ inch steel plate) is welded to middle points of the seat frame beams 52*a*, 52*b*, and a threaded nut 58 (e.g. ¾" internal diameter) is welded to the seat mount bar 56 over a through hole 56*a* provided in the seat mount bar 54. (The internal diameter of the threaded nut 58 is smaller than the internal diameter of the through hole.) A threaded steel shaft 60 (made e.g. from ¾" round steel stock) is threadingly received in the nut 58, and an upper seat mount plate 62 is securely connected (e.g. by welding or fastening) to an upper end of the threaded steel shaft 60. The seat 54 is fastened e.g. to the corners of the upper seat mount plate 62 by screws (not shown) which pass through the upper seat mount plate 62 and into the underside of the seat 54; the longitudinal position of the mounted seat 54 relative to the base frame 30 is such that the center-of-gravity of a seated sulky operator will be forward of the position of the wheel axle 38. By rotating the seat 54 relative to the nut 58 and the seat mount bar 56, the height of the seat can be adjusted.

Figure 5:
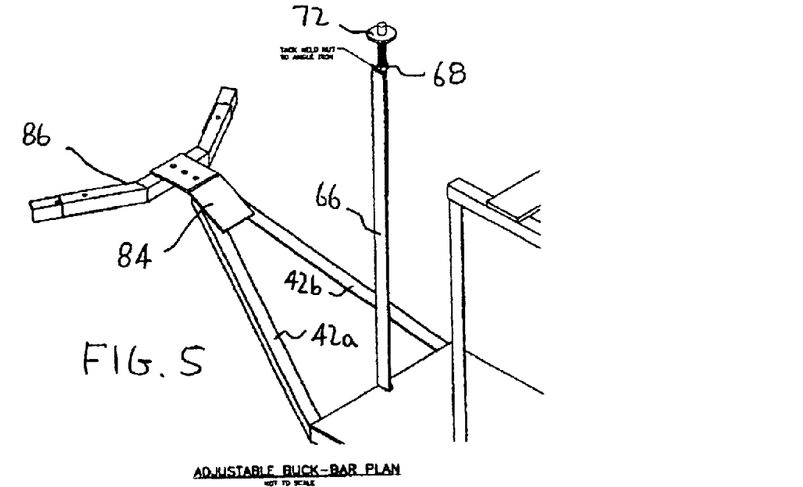
FIGS. 5 and 6 are perspective and exploded views of the adjustable buck-bar.
Figure 6:
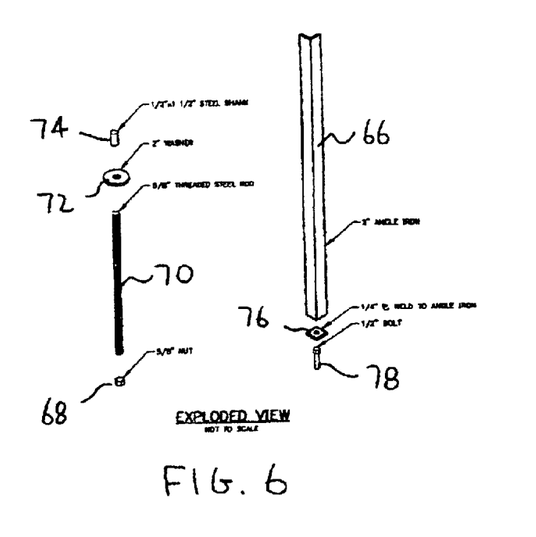
Figure 7:
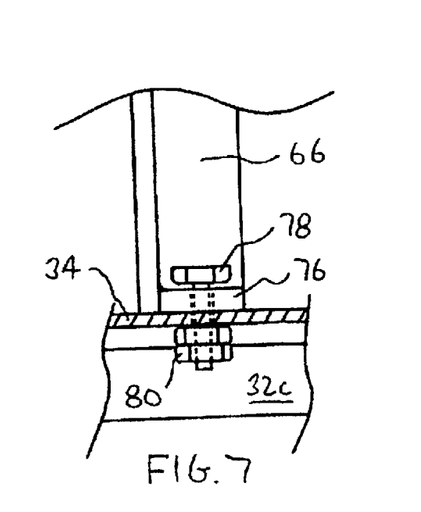
FIG. 7 is a cross-sectional view taken along lines 7—7 in FIG. 1 showing the buck-bar and base frame of the sulky.

An adjustable buck-bar 64 is mounted to a midsection or intermediate portion of the trailer frame 20 in the manner shown in FIGS. 5 to 7. (The "midsection or intermediate portion" is defined as rearward of the hitch frame 40 and forward of the axle 38.) Specifically, the adjustable buck-bar includes an upstanding angle-iron 66, a nut 68 welded to the inside, top portion of the angle-iron 66, a threaded steel rod 70 which is adapted to be threadingly received by the nut 68 (so as to form a threaded intermediate connection which functions as a length adjusting means) in such a manner as to be telescopically extendable and retractable relative to the angle-iron 66 (e.g. by rotating the threaded steel rod 70 relative to the nut 68 and angle-iron 66), a relatively-thick large-diameter washer 72 welded to the top of the threaded steel rod 70, and a cylindrical steel shank 74 welded to the large-diameter washer 72. In the preferred embodiment, the angle-iron 66 can be 1½" section angle-iron (approximately 30" in length), the nut 68 can have a ⅝" threaded bore, the threaded steel stock 70 can have a ⅝" diameter and be up to 33" in length, the washer 72 can have a 2" outer-diameter, and the cylindrical steel shank 74 can have a ½" diameter and a 1½" length.

The manner in which the adjustable buck-bar 64 is loosely connected to the midsection of the trailer frame 20 so as to provide adjustability in the angular orientation of the adjustable buck-bar relative to the trailer frame (as shown by the curved arrows in FIG. 1) is shown in FIGS. 6 and 7. Specifically, a small square section 76 of ¼" thick steel plate is welded to the inside, bottom portion of the angle-iron 66. A bolt 78 passes through (with clearance) aligned holes formed in both the small square section 76 of the buck-bar and the steel plate 34 of the base frame 30, and is loosely secured in position by means of nuts 80 or other suitable means. The loose bolted connection thus effected between the buck-bar 64 and the steel plate 34 of the base frame 30 permits the buck-bar 64 to swivel and tilt relative to the trailer frame 20 by small angles of up to 10 or 20 degrees or more. Particularly, the buck-bar 64 can tilt forwardly up to 20 degrees or more.

Figure 8:
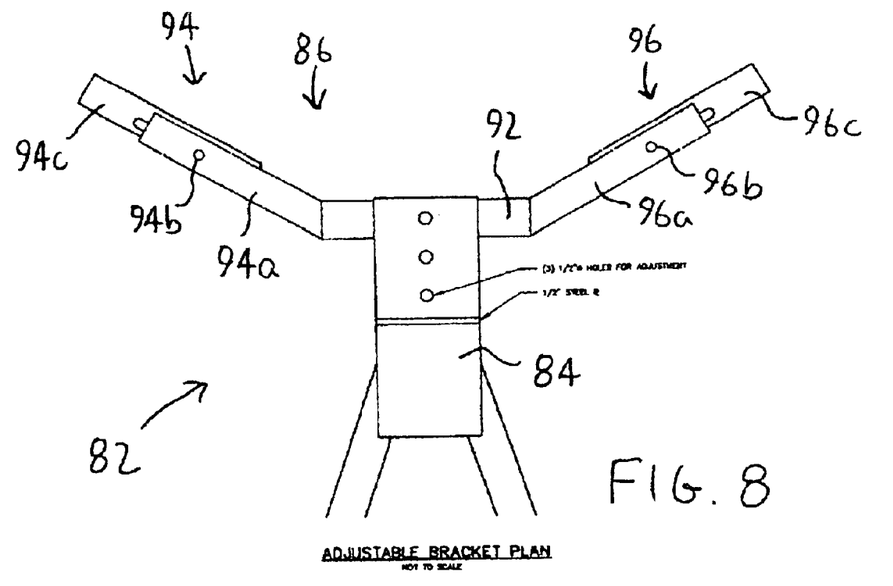
FIGS. 8 and 9 are top perspective and part-exploded views of the adjustable polygonal bracket assembly.

An adjustable hitch assembly 82 is shown in FIG. 8. The adjustable hitch assembly is an attachment to the trailer frame 20 of the two-wheeled riding sulky S and is interposed between a forward end of the trailer frame 20 and a frame of the powered ground maintenance machine. The adjustable hitch assembly 82 includes as its principal components a hitch tongue 84 which is connected to the hitch frame 40, an adjustable polygonal bracket assembly 86 adapted to be connected to the frame of the powered ground maintenance machine, and connection means (i.e. as in the hitch connection shown in FIG. 11) for interconnecting the hitch tongue 84 and the adjustable polygonal bracket assembly 86.

The hitch tongue 84 (made from e.g. ¼" bent steel plate) is welded to the apex formed between the beam members 42*a*, 42*b* of the hitch frame 40, as shown in FIGS. 1 and 8. (The hitch tongue 84 is thus disposed at the forward portion of the trailer frame 20 and the upper end of the hitch frame 40.) The hitch tongue 84 includes a forward, generally horizontally extending hitching portion 88. In the preferred embodiment, the hitching portion 88 includes three spaced-apart hitching holes 90, the purpose of which will be explained with respect to FIG. 10. The purpose of the three spaced-apart hitching holes 90 is to accommodate different powered ground maintenance machines with differing depths and handle bar positions. (As used herein, the phrase "hitch tongue" encompasses any structure having a generally horizontally extending extension used for hitching; the hitch tongue need not be made from a flat or bent plate but can have a box-section or circular cross-section, as is conventional in the art.)

Figure 9:
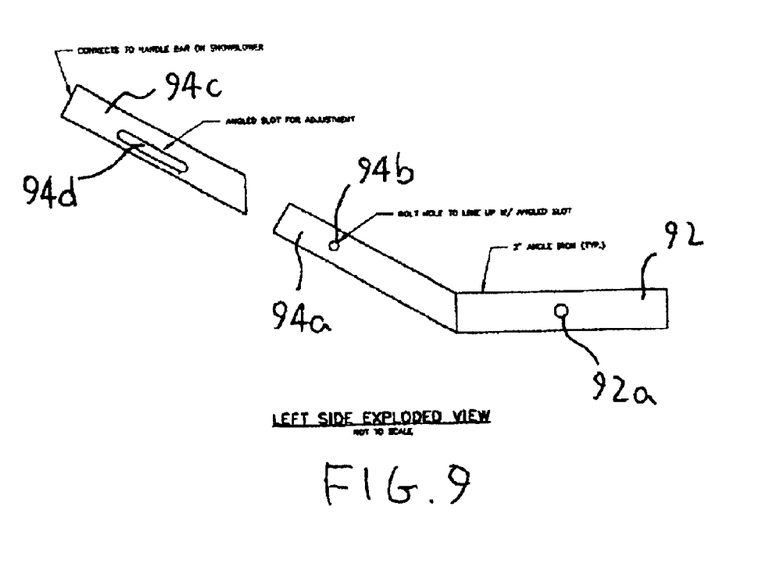

The adjustable polygonal bracket assembly 86 is shown in FIGS. 8 and 9, and includes a central transverse bar 92 which interconnects left-side and right-side angled extension assemblies 94, 96. (The transverse bar 92 and the angled extension assemblies 94, 96 together resemble three connected sides of an octagon or other higher-order polygon. As used herein, the word "polygonal" shall mean "of or pertaining to at least two sides of a polygon".) The central transverse bar 92 (typically made from a 1½" or 2" section angle-iron, approximately 6" in length) includes a central hole 92*a* extending downwardly through the bar. The left-side and right-side angled extension members 94, 96 are mirror images of each other and each include (as shown in FIG. 9) a fixed extension bar 94*a* having a bolt hole 94*b* formed therein, and a telescoping extension bar 94c formed with a slot 94d therein. The fixed extension bars 94a, 96a are welded to the ends of the central transverse bar 92, and the telescoping extension bars 94c, 96c are adapted to be connected to the fixed extension bars 94a, 96a by aligning the slots in the telescoping extension bars with the holes in the fixed extension bars and securing the bars together with nuts and bolts (see 94c, 96e in FIG. 10) that pass through the aligned slots and holes (to thereby form telescopic joints). In the preferred embodiment, the fixed and telescoping extension bars are made from 1½" or 2" section angle irons (e.g. 6" in length each); these angle-irons are adapted to slide one along the other with their openings 94b, 94d and 96b, 96d aligned and their corners nested. The lengths of the angled extension assemblies 94, 96 can thus be varied according to the lengths of the slots 94d, 96d and thereby accommodate variations in the width of the frame of different ground maintenance machines.

Figure 10:
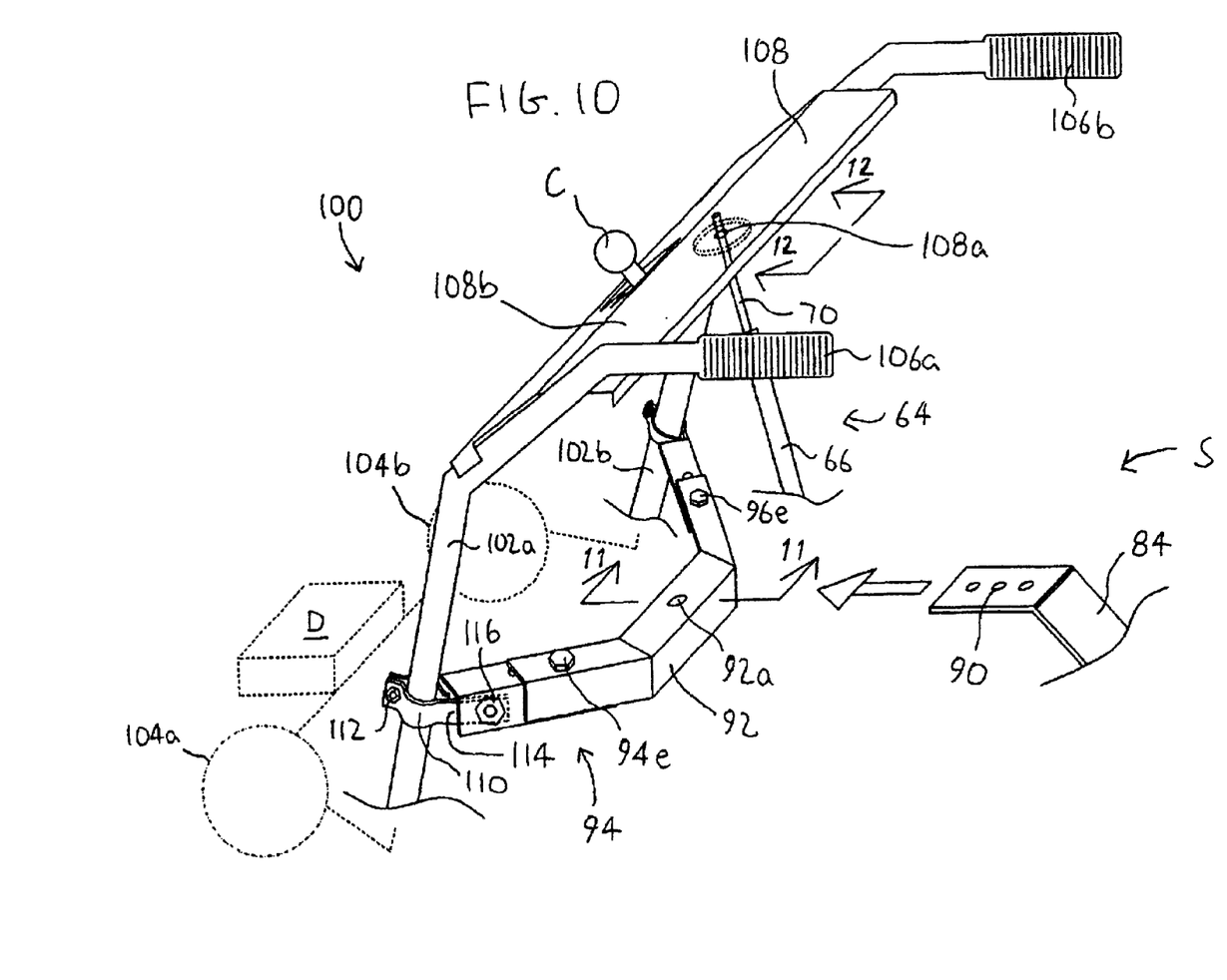
FIG. 10 is a perspective view of the manner in which the sulky is attached to a powered ground maintenance machine in a tractor-trailer relationship.

FIG. 10 reveals the manner in which the sulky S is connected or attached to a powered ground maintenance machine 100. As used herein, the terminology "powered ground maintenance machine" will include not only self-propelled snow blowers and lawn mowers, but also other self-propelled walk-behind machines which can function as a tractor for the sulky and which are effective to perform ground maintenance or ground work. In the preferred embodiment, the powered ground maintenance machine may comprise a snow blower having only two load-bearing, ground-engaging, powered or traction members (wheels or tracks) which are co-axially mounted (in the case of wheels) or symmetrically mounted about the longitudinal central vertical plane of the machine (in the case of tracks) and which support driving and working elements indicated schematically at D. (The two-wheeled or two-tracked snow blower thus described may also have front skids, casters or other auxiliary supporting wheels which are not intended to have a significant load bearing function during a snow-blowing operation of the snow blower; see e.g. U.S. Pat. Nos. 4,457,086; 4,255,879; and 3,239,954, all of which are incorporated by reference herein.) As shown schematically in FIG. 10, left and right upright frame or arm members 102a, 102b of the snow blower (or other ground maintenance machine) extend rearwardly and upwardly from the vicinities of the two (e.g. 12") ground engaging wheels 104a, 104b thereof. As is typical, the frame members 102a, 102b terminate at left and right handle bars 106a, 106b, and an operator's console 108 (made from sheet metal and having an operator control C thereon; the console is also considered part of the snow blower frame) is mounted between the two frame members 102a, 102b in the upper area of the frame between and adjacent to the handle bars 106a, 106b. Clutch, transmission, engine, direction and/or ground speed controls (not shown) are conventionally integrated with the handle bars 116 and/or operator's console 108 of the snow blower (or other ground maintenance machine), as is well known in the art and as shown in the U.S. patents incorporated by reference herein.

Describing now the method of making the (primary) hitch connection (which carries the tensile loads) between the snow blower (or other ground maintenance machine) and the sulky S, it is preferred to secure removable two-part brackets 110 (e.g. of the kind typically found in heavy-duty fence construction) to each of the left and right uprights 102a, 102b of the snow blower frame. Screws or removable fasteners 112 on the brackets 110 are tightened somewhat to clamp the brackets 110 to the uprights after the brackets are appropriately positioned with their mounting flanges 114 extending rearwardly and inwardly from the upright frame members 102a, 102b. (A typical appropriate bracket height for the an 8-hp snow blower is approximately 20" from the ground. The relative angles of the bracket flanges 114 on the left and right uprights should approximate, as closely as possible, the relative angles of the left and right extension assemblies 94, 96 of the adjustable polygonal bracket assembly 86.)

Continuing with the description of the connection method, the adjustable polygonal bracket assembly 86 is next appropriately adjusted and assembled to the brackets 110 on the uprights of the snow blower. Specifically, the positions of the bolts 94e, 96e in the slots of the telescoping extension bars 94c, 96c are adjusted (by sliding the telescoping extension bars relative to the fixed extension bars) so that the transverse length of the adjustable polygonal bracket assembly 86 approximates the transverse distance between the respective mounting flanges of the brackets 110. Thereafter, nuts and bolts 116 are employed to connect the ends of the telescoping extension bars 94c, 96c to the respective mounting flanges 114 of the left-side and right-side mounting brackets 110. (Each bolt 116 passes through unnumbered aligned bolt holes provided in the respective mounting flange 114 and the respective end of the telescoping extension bar, thereby securing the respective parts together.)

After the adjustable polygonal bracket assembly 86 has been initially mounted to the upright frame members 102a, 102b by means of the brackets 110 and the nuts and bolts 116, then all of the nuts and bolts 94e, 96e, 112, 116 in the vicinity of the adjustable polygonal mounting bracket 86 are firmly tightened to firmly and substantially rigidly connect the adjustable polygonal bracket assembly 86 to the upright frame members 102a, 102b of the snow blower 100.

Figure 11:
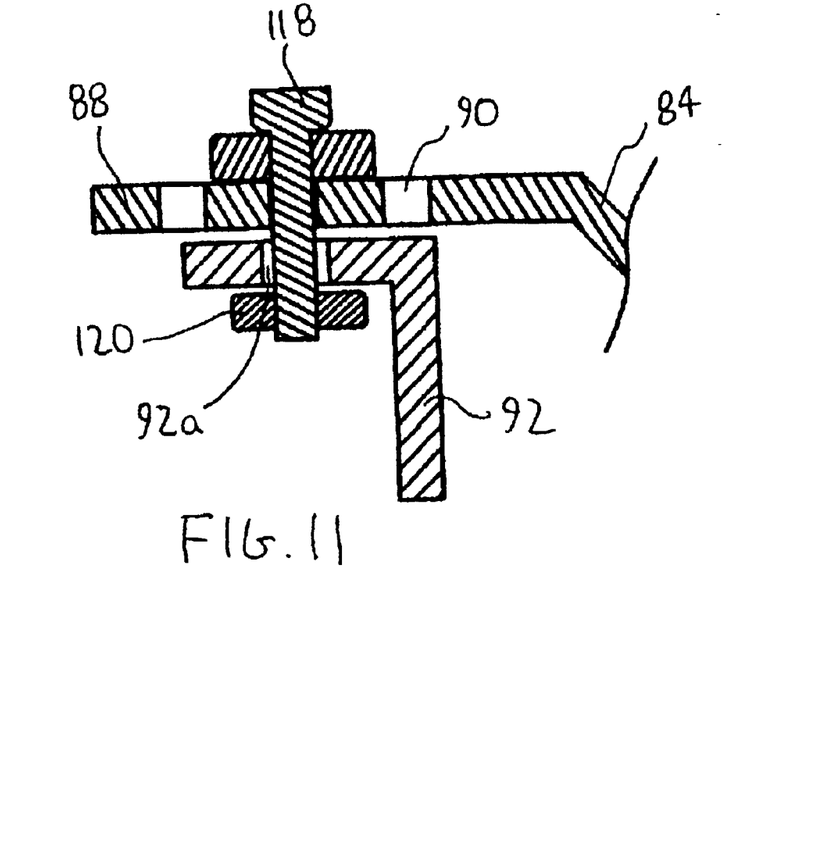
FIG. 11 is a cross-sectional view taken along lines 11—11 in FIG. 10 showing the connection between the hitch tongue of the sulky and the adjustable polygonal bracket assembly.

Next, the hitch tongue 84 is connected to the central hole 92a in the transverse bar 92 of the polygonal bracket assembly 86 in the manner shown in FIG. 11. Specifically, the trailer frame 20 is brought near to the snow blower 100 and positioned in such a manner that the hitch tongue 84 rests upon the polygonal bracket assembly 86 (and thereby pushes downwardly on the rear of the snow blower) and one of the holes 90 in the hitching portion 88 overlies the central hole in the transverse bar 92 of the polygonal bracket assembly 86. (The selection of which of the holes 90 overlies the central hole 92a of the transverse bar 92 is one of convenience; it is known that the buck-bar 64 functions well when, after assembly, it tilts forwardly by up to approximately 20 degrees, as shown in FIG. 10, and at other diverse angles.) Then, a bolt or hitch pin 118 is dropped into the aligned holes 90, 92a so as to be loosely received therein and permit rotation (about the vertical axis of the hitch pin 118) and some swivelling between the trailer frame 20 and the polygonal bracket assembly 86 (and thus the snow blower to which the polygonal bracket assembly 86 is rigidly attached). Thereafter, a nut 120 (or a locking pin, as is conventional in the hitching art) may be employed to prevent the loosely held bolt 118 from coming out of the aligned holes. This completes the description of the making of the (primary) hitch connection.

Next, it is necessary to connect the adjustable buck-bar 64 to an upper frame portion of the snow blower 100. (As used herein, the "upper frame portion" of the snow blower includes all substantially relatively fixed appurtenances and force carrying members of the snow blower or powered ground maintenance machine which are located above and apart from the primary hitch connection or hitch point. As such, in the preferred embodiment, the adjustable buck-bar 64 will transmit forces to the snow blower frame at a point or points which is/are above and not coextensive with the point or points where the adjustable polygonal bracket assembly 86 connects to the two frame members 102a, 102b. In other words, in a force diagram, the force application point(s) of the adjustable buck-bar 64 on the powered ground maintenance machine is/are above the force application point(s) of the primary hitch connection or hitch point on the powered ground maintenance machine.) The buck-bar can be thought of a "secondary" hitch connection because the buck-bar is used to prevent the snow blower from bucking forward and backward under load; however, unlike (primary or conventional) hitch connections which act primarily in tension, the buck-bar operates primarily in compression.

Figure 12:
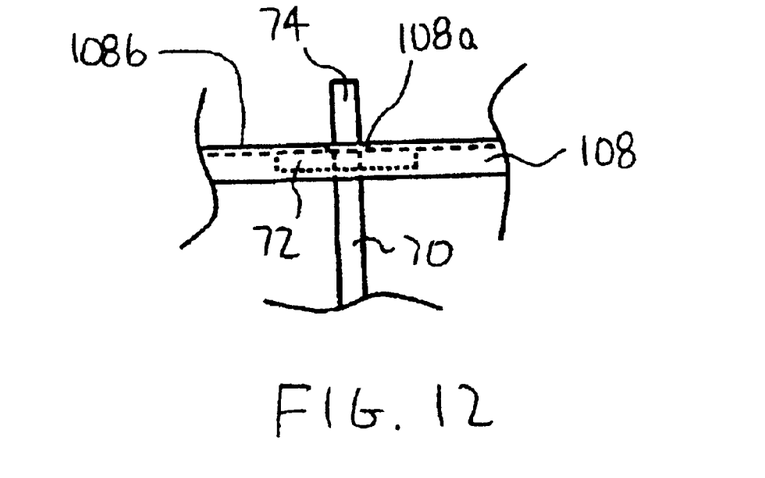
FIG. 12 is a rear view of the console of the powered ground maintenance machine showing the manner in which the buck-bar is received at the underside of the console.

Referring again to FIG. 10, and also to FIG. 12, to connect the top of the adjustable buck-bar 64 to the upper portion of the snow blower 100, a small (e.g. ⅝" inch) hole 108a is drilled (or cut or formed) centrally in the upper horizontal portion 108b of the snow blower operator's console 108. (This is the only permanent modification to the snow blower that is required according to the preferred embodiment of the invention.) Next the adjustable buck-bar 64 is shortened (by rotating the upstanding angle-iron 66 relative to the threaded steel rod 70, by hand or with pliers or other gripping means, if necessary) sufficiently to allow the cylindrical steel shank 74 of the buck-bar 64 to be moved to a position directly underneath the hole 108a in the operator's console 108. Thereafter, the adjustable buck-bar 64 is lengthened (i.e. so that the cylindrical steel shank 74 enters and extends through the hole 108a) until the large-diameter washer 72 pushes against the underside of the operator's console. The buck-bar thus becomes securely positioned between the base frame 30 of the sulky S and the operator's console 108 of the snow blower 100, and may even be preloaded in compression. This completes the description of the connection method.

An operator may next sit on the seat 54. Because the buck-bar 64 is mounted to the base frame 30 approximately 30" in front of the sulky's wheel axle 38 and (depending on the snow blower 100) approximately 18" in back of the snow blower's wheel axle location, and because the center-of-gravity of a seated operator is disposed forwardly of the sulky axle 38, and because the upright frame members 102a, 102b of the snow blower extend upwardly and backward from the region of the snow blower's wheels, and because the buck-bar 64 is mounted to the snow blower operator's console at a position substantially higher than and rearward of the position of the (primary) hitch connection, the operative length of the buck-bar (i.e. that portion of the buck-bar between the large diameter washer 72 and the bottom end of the upstanding angle-iron 66, which is adjustable in length) will experience a certain amount of compressive force when the operator sits on the seat. Additional reaction forces will also be generated on the buck-bar during the dynamic operation of the snow blower. It is the reaction forces in the buck-bar that are believed to prevent the "bucking" of the snow blower that would otherwise occur if the buck-bar were not employed.

While the invention has been described with certain particularity, it is not meant to be limited to the above described preferred embodiments. For example, all dimensions and angles given are merely for illustrative purposes only and are not meant to limit the invention in any way. Means (such as a cotter pin) may be provided for preventing the upper end of the buck-bar from popping out of the hole 108a during operation of the snow blower over very rough terrain. While the adjustable polygonal bracket assembly 86 has been shown as being removably secured to the uprights 102a, 102b of the snow blower frame, it would be equally possible to permanently secure the assembly to the uprights (e.g. by welding). Therefore, the present invention will encompass the above described preferred embodiments as well as any other modifications and equivalents thereof which will fall within the scope of the appended claims.

I claim:

1. A riding attachment for a powered ground maintenance machine, comprising:

a trailer frame for supporting a rider;

a pair of spaced-apart wheels rotatably mounted to a rear portion of the trailer frame;

a hitch assembly provided at a forward portion of the trailer frame for connecting the riding attachment to a frame of the powered ground maintenance machine, the hitch assembly allowing relative movement between the trailer frame and the powered ground maintenance machine about a vertical axis; and a buck-bar, for supporting compressive loads, interconnected between a midsection of the trailer frame and an upper portion of the frame of the powered around maintenance machine, wherein an operative length of the buck-bar is adjustable.

2. The riding attachment as recited in claim 1, wherein the buck-bar includes a threaded intermediate connection, and wherein the operative length of the buck-bar is adjusted by rotating the threaded intermediate connection.

3. The riding attachment as recited in claim 1, wherein the buck-bar is loosely connected to the midsection of the trailer frame so as to provide adjustability in the angular orientation of the buck-bar relative to the trailer frame.

4. The riding attachment as recited in claim 1, wherein the powered ground maintenance machine is a snow blower.

5. The riding attachment as recited in claim 1, wherein the powered ground maintenance machine has only two ground-engaging traction members.

6. The riding attachment as recited in claim 1, wherein the trailer frame includes a base frame, and wherein the forward portion of the trailer frame includes a hitch frame that extends upwardly from the base frame.

7. The riding attachment as recited in claim 6, wherein the hitch assembly includes a hitch tongue which is connected to the upper end of the hitch frame.

8. The riding attachment as recited in claim 7, wherein the hitch assembly further includes an adjustable polygonal bracket assembly which connects to the frame of the powered ground maintenance machine.

9. The riding attachment as recited in claim 8, wherein the adjustable polygonal bracket assembly is removably secured to the frame of the powered ground maintenance machine by means of removable fasteners.

10. The riding attachment as recited in claim 8, wherein the adjustable polygonal bracket assembly includes a pair of telescopic joints for accommodating variations in a width of the frame of the powered ground maintenance machine.

11. The riding attachment as recited in claim 2, further including a seat frame and a vertically adjustable seat connected to the seat frame.

12. In combination, a two-wheeled riding sulky attachment and a powered ground maintenance machine, the combination further comprising:

an adjustable hitch assembly interposed between a forward end of the two-wheeled riding sulky attachment and a frame of the powered ground maintenance machine, the adjustable hitch assembly including a hitch tongue connected to the two-wheeled riding sulky attachment, an adjustable polygonal bracket assembly connected to the frame of the powered ground maintenance machine, and connection means for interconnecting the hitch tongue and the adjustable polygonal bracket assembly; and an adjustable buck-bar interposed between an intermediate portion of the two-wheeled riding sulky attachment and an upper portion of the powered ground maintenance machine, the adjustable buck-bar including length adjusting means for adjusting an operative length of the buck-bar between the intermediate portion of the two-wheeled riding sulky attachment and an upper portion of the powered ground maintenance machine.

13. The combination as recited in claim 12, wherein the length adjusting means includes a threaded connection, and wherein the operative length of the buck-bar is adjusted by rotating the threaded connection.

14. The combination as recited in claim 12, wherein the buck-bar is loosely connected to the intermediate portion of the two-wheeled riding sulky attachment so as to provide adjustability in the angular orientation of the buck-bar relative to a trailer frame of the two-wheeled riding sulky attachment.

15. The combination as recited in claim 12, wherein the powered ground maintenance machine is a snow blower.

16. The combination as recited in claim 12, wherein the powered ground maintenance machine has only two ground-engaging traction members.

17. The combination as recited in claim 12, wherein the adjustable polygonal bracket assembly is removably secured to the frame of the powered ground maintenance machine by means of removable fasteners.

18. The combination as recited in claim 12, wherein the adjustable polygonal bracket assembly includes a pair of telescopic joints for accommodating variations in a width of the frame of the powered ground maintenance machine.

19. The combination as recited in claim 12, wherein the two-wheeled riding sulky attachment further comprises a seat frame and a vertically adjustable seat connected to the seat frame.

* * * * *